(12) United States Patent  
Cannon et al.

(10) Patent No.: US 8,909,038 B2  
(45) Date of Patent: Dec. 9, 2014

(54) METHOD AND APPARATUS PROVIDING TRANSIENT CONTROL IN OPTICAL ADD-DROP NODES

(75) Inventors: Cristina Barbosa Cannon, Jersey City, NJ (US); Stefan Hunsche, Jersey City, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 2200 days.

(21) Appl. No.: 10/338,097

(22) Filed: Jan. 7, 2003

(65) Prior Publication Data

US 2004/0131353 A1 Jul. 8, 2004

(51) Int. Cl.
*H04B 10/00* (2013.01)
*H04J 14/02* (2006.01)
*H04B 10/296* (2013.01)

(52) U.S. Cl.
CPC ......... *H04J 14/0221* (2013.01); *H04J 14/0212* (2013.01); *H04J 14/0204* (2013.01); *H04B 10/296* (2013.01)
USPC .................................................. 398/6; 398/7

(58) Field of Classification Search
USPC ............................. 398/83, 94, 5–7
See application file for complete search history.

(56) References Cited

U.S. PATENT DOCUMENTS

| | | | |
|---|---|---|---|
| 4,449,247 A * | 5/1984 | Waschka, Jr. ..................... 455/9 |
| 4,451,916 A * | 5/1984 | Casper et al. ..................... 714/4 |
| 5,442,623 A * | 8/1995 | Wu ................................ 370/224 |
| 5,751,454 A * | 5/1998 | MacDonald et al. ........... 398/59 |
| 5,900,968 A * | 5/1999 | Srivastava et al. ....... 359/341.41 |
| 5,920,412 A * | 7/1999 | Chang .............................. 398/83 |
| 5,923,449 A * | 7/1999 | Doerr et al. ........................ 398/7 |
| 5,986,782 A * | 11/1999 | Alexander et al. .............. 398/26 |
| 5,999,290 A * | 12/1999 | Li .................................... 398/83 |
| 6,005,699 A * | 12/1999 | Tomooka et al. ................ 398/43 |
| 6,046,832 A * | 4/2000 | Fishman ........................ 398/45 |
| 6,088,141 A * | 7/2000 | Merli et al. ...................... 398/5 |
| 6,101,012 A * | 8/2000 | Danagher et al. ................ 398/1 |
| 6,115,155 A * | 9/2000 | Liu et al. .......................... 398/5 |
| 6,122,095 A * | 9/2000 | Fatehi .......................... 359/337 |
| 6,134,047 A * | 10/2000 | Flood et al. .............. 359/337.12 |
| 6,151,336 A * | 11/2000 | Cheng et al. ................. 370/535 |
| 6,233,074 B1 * | 5/2001 | Lahat et al. ..................... 398/79 |
| 6,249,510 B1 * | 6/2001 | Thompson .................... 370/223 |
| 6,278,536 B1 * | 8/2001 | Kai et al. ......................... 398/79 |
| 6,356,386 B1 * | 3/2002 | Denkin et al. ................ 359/337 |
| 6,396,625 B1 * | 5/2002 | Nakaji ..................... 359/341.41 |
| 6,456,406 B1 * | 9/2002 | Arecco et al. .................. 398/59 |
| 6,466,341 B1 * | 10/2002 | Lumish et al. ................. 398/82 |
| 6,466,344 B2 * | 10/2002 | Shimomura et al. ........... 398/82 |
| 6,477,288 B1 * | 11/2002 | Sato ................................ 385/16 |
| 6,512,864 B1 * | 1/2003 | Lin et al. ........................ 385/24 |

(Continued)

OTHER PUBLICATIONS

"Fiber Distributed Data Interface (FDDI)", Dictionary of Communications Technology, Wiley, 1998.*

(Continued)

*Primary Examiner* — Danny Leung
(74) *Attorney, Agent, or Firm* — Wall & Tong LLP

(57) ABSTRACT

A method and apparatus for determining if an optical input signals has been interrupted and responsively replacing an interrupted optical input signal with a replacement optical signal having a similar optical profile (e.g., such as a loopback between OADMs within a backbone network), thereby insuring that transient-induced high speed optical amplifier adjustments are avoided.

40 Claims, 6 Drawing Sheets

(56) References Cited

U.S. PATENT DOCUMENTS

| | | | |
|---|---|---|---|
| 6,519,060 B1* | 2/2003 | Liu | 398/49 |
| 6,522,460 B2* | 2/2003 | Bonnedal et al. | 359/341.42 |
| 6,535,309 B1* | 3/2003 | Terahara | 398/79 |
| 6,650,467 B2* | 11/2003 | Lee et al. | 359/337.4 |
| 6,721,502 B1* | 4/2004 | Al-Salameh et al. | 398/3 |
| 6,735,391 B2* | 5/2004 | Lee et al. | 398/3 |
| 6,906,804 B2* | 6/2005 | Einstein et al. | 356/484 |
| 6,907,201 B1* | 6/2005 | Frankel | 398/158 |
| 6,922,530 B1* | 7/2005 | Kauffeldt et al. | 398/7 |
| 6,933,852 B2* | 8/2005 | Kitajima et al. | 340/635 |
| 6,970,614 B2* | 11/2005 | Tsushima et al. | 385/16 |
| 6,973,267 B1* | 12/2005 | Arecco et al. | 398/4 |
| 6,987,899 B2* | 1/2006 | Fukashiro et al. | 385/16 |
| 7,016,610 B2* | 3/2006 | Xiao et al. | 398/83 |
| 7,072,580 B2* | 7/2006 | Arecco et al. | 398/4 |
| 7,280,761 B2* | 10/2007 | Aono | 398/94 |
| 7,283,739 B2* | 10/2007 | Kinoshita et al. | 398/3 |
| 7,283,740 B2* | 10/2007 | Kinoshita et al. | 398/5 |
| 7,327,954 B2* | 2/2008 | Palacharla et al. | 398/30 |
| 7,356,257 B2* | 4/2008 | Kitajima et al. | 398/45 |
| 7,356,258 B1* | 4/2008 | Weverka et al. | 398/59 |
| 7,421,197 B2* | 9/2008 | Palacharla et al. | 398/5 |
| 7,430,373 B2* | 9/2008 | Yamashita | 398/83 |
| 7,522,839 B2* | 4/2009 | Onaka et al. | 398/83 |
| 7,580,631 B2* | 8/2009 | Shimada | 398/30 |
| 2001/0014104 A1* | 8/2001 | Bottorff et al. | 370/471 |
| 2002/0021861 A1* | 2/2002 | Gnauck et al. | 385/24 |
| 2002/0080440 A1* | 6/2002 | Li et al. | 359/110 |
| 2002/0101636 A1* | 8/2002 | Xiao et al. | 359/127 |
| 2002/0105693 A1* | 8/2002 | Kobayashi et al. | 359/124 |
| 2002/0131116 A1* | 9/2002 | Shimomura et al. | 359/124 |
| 2002/0159117 A1* | 10/2002 | Nakajima et al. | 359/127 |
| 2002/0181039 A1* | 12/2002 | Garnot et al. | 359/110 |
| 2002/0186429 A1* | 12/2002 | Kaspit et al. | 359/110 |
| 2003/0025956 A1* | 2/2003 | Li et al. | 359/110 |
| 2003/0039003 A1* | 2/2003 | Jakobik et al. | 359/115 |
| 2003/0053750 A1* | 3/2003 | Yang et al. | 385/27 |
| 2003/0081283 A1* | 5/2003 | Ishizuka et al. | 359/124 |
| 2003/0081308 A1* | 5/2003 | So | 359/337 |
| 2003/0099475 A1* | 5/2003 | Nemoto et al. | 398/83 |
| 2003/0118272 A1* | 6/2003 | Tsushima et al. | 385/16 |
| 2003/0128979 A1* | 7/2003 | Kitajima et al. | 398/12 |
| 2004/0052521 A1* | 3/2004 | Halgren et al. | 398/19 |
| 2004/0052524 A1* | 3/2004 | Arnold | 398/38 |
| 2004/0057732 A1* | 3/2004 | Usui et al. | 398/177 |
| 2004/0086278 A1* | 5/2004 | Proano et al. | 398/154 |
| 2004/0131353 A1* | 7/2004 | Cannon et al. | 398/1 |
| 2004/0208519 A1* | 10/2004 | Feldman et al. | 398/30 |
| 2006/0251423 A1* | 11/2006 | Evangelides et al. | 398/105 |
| 2008/0138070 A1* | 6/2008 | Yan et al. | 398/65 |

OTHER PUBLICATIONS

"Optical WDM node for highly-reliable AGC/ALC of EDFAs by employing power-managed control channel", H. Ono, K. Shimano, M. Fukutoku, and S. Kuwano. OSA Trends in Optics and Photonics Series, vol. 44, Jul. 9-12, 2000. Optical Society of America.*

* cited by examiner

METHOD AND APPARATUS PROVIDING TRANSIENT CONTROL IN OPTICAL ADD-DROP NODES

FIELD OF INVENTION

The invention relates generally to the field of communications and, more specifically, to a method and apparatus for mitigating the effect of transients in optically amplified transmission systems.

BACKGROUND OF INVENTION

Optical add-drop nodes such as optical add-drop multiplexers (OADMs) form a key functional element in dense wavelength-division multiplexed (DWDM) optical fiber networks. Optical amplifiers such as erbium doped fiber amplifiers, semi-conductor optical amplifiers, Raman amplifiers and the like are commonly deployed within such networks to overcome the attenuation of transmission fibers between nodes or the attenuation of components within network elements. The optical amplifiers typically operate in a saturated regime where, the total output power depends sub-linearly on the number of input channels or is essentially constant. If the number of input channels (i.e., wavelengths) passing through such an amplifier is suddenly reduced, the optical power of the remaining channels will be increased, potentially to the level that degrades optical quality (e.g., measured by a bit error rate) of these remaining channels. For example, in the case of an OADM node receiving a plurality of optical channels and adding a single channel, a fiber-cut upstream of the OADM node (or disconnected OADM input) will cause the sudden elimination of optical energy associated with the received 'through' channels, while the remaining 'add' channel will receive most of the total optical amplifier power that had previously been distributed among all the channels exiting the OADM. The sudden power change will have detrimental immediate effects not only on the added channel, but also on the stability of all the network elements downstream from the fiber cut. The optical power of the surviving channels can, in principle, be adjusted back to the desired value by re-adjusting the pump conditions of all optical amplifiers. However, in a large network with many WDM channels it is a very significant challenge to accomplish this in a time period sufficiently short to avoid noticeable effects on the network operation.

SUMMARY OF THE INVENTION

These and other deficiencies of the prior art are addressed by the present invention of a method and apparatus for determining if an optical input signal to an OADM has been interrupted and responsively replacing an interrupted optical input signal with a replacement optical signal having a similar optical profile, thereby suppressing transient power changes in uninterrupted 'add' channels without requiring any changes to the optical amplifier operating parameters.

A method according to one embodiment of the invention comprises monitoring at least some of a plurality of optical signals to determine if the monitored optical signals have been interrupted, where the optical signals are adapted for use by an optical amplifier and, in response to the interruption of the monitored optical signals, replacing the monitored optical signals with other optical signals.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The subject invention will be primarily described within the context of an optical add-drop multiplexer (OADM) which may be used in wavelength-division multiplexed (WDM) and dense WDM (DWDM) optical communications systems carrying various traffic types (e.g., SONET). However, it will be appreciated by those skilled in the art that the invention may be advantageously employed in any optical communications system in which it is desirable to avoid the need for fast optical amplifier response to transient conditions such as caused by, for example, a severed optical fiber.

Figure 1:
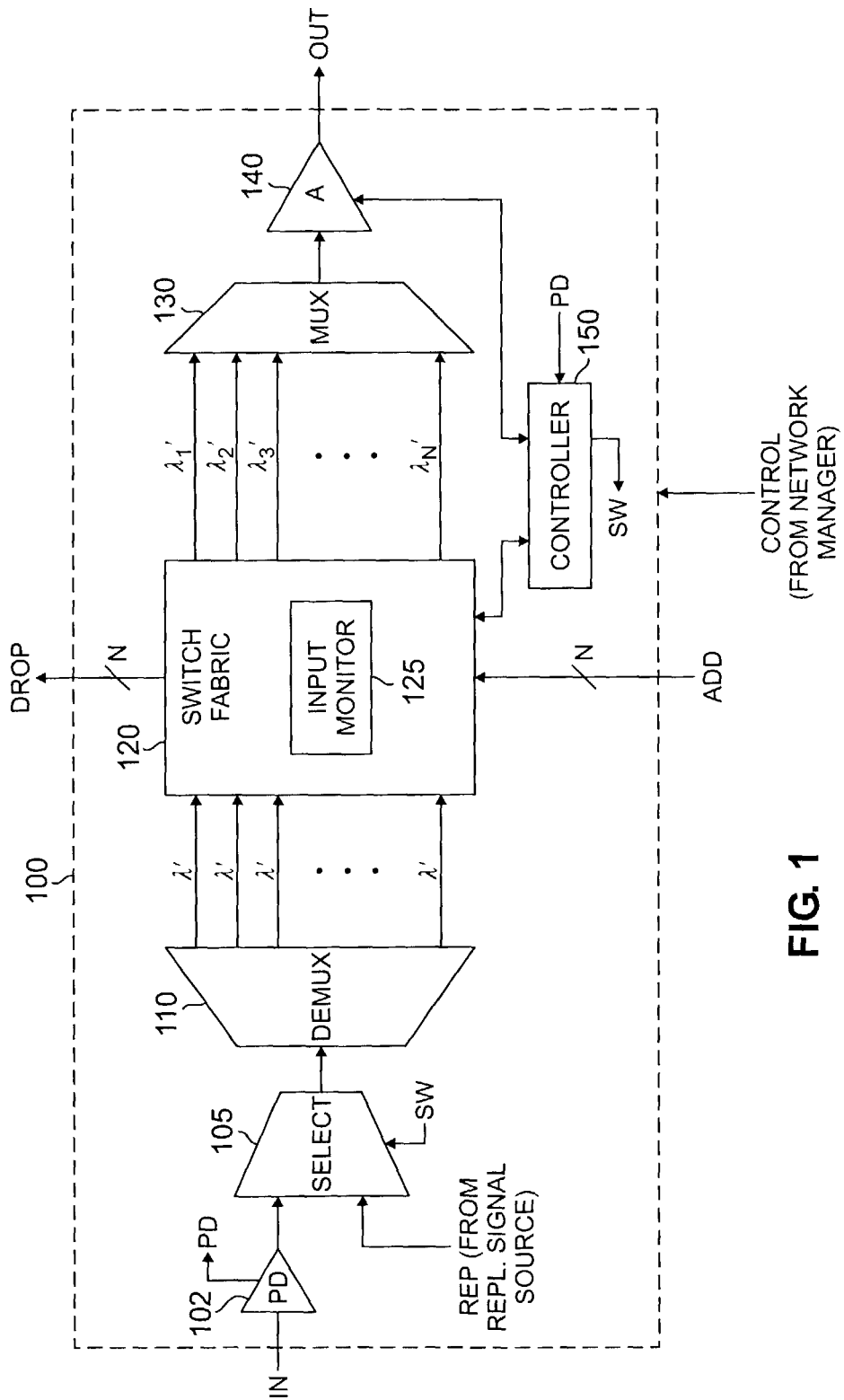
FIG. 1 depicts a high level block diagram of an optical add-drop multiplexer (OADM) according to an embodiment of the present invention.

FIG. 1 depicts a high level block diagram of an optical add-drop multiplexer (OADM) according to an embodiment of the present invention. Specifically, the OADM 100 of FIG. 1 comprises an input selector 105, a demultiplexer 110, a switching fabric 120, a multiplexer 130, an optical amplifier 140 and a controller 150. The OADM 100 of FIG. 1 receives an input signal IN, illustratively a WDM or DWDM optical signal comprising N optical signals having respective wavelengths $\lambda_1$-$\lambda_N$ and transported via an optical fiber and responsively produces a corresponding output signal OUT. The OADM 100 of FIG. 1 operates to controllably pass through, insert (add) and/or extract (drop) optical communications signals having specified wavelengths to implement thereby the known add-drop function. The OADM 100 is controlled by a network manager or element manager (not shown) via a control signal CONTROL.

The input selector 105, in response to a control signal SW produced by the controller 150, responsively couples one of the input signal IN and a replacement signal REP to an input of the demultiplexer 110. The replacement signal REP comprises a signal having optical characteristics similar to those of the input signal IN. Specifically, in the embodiment of FIG. 1 the replacement signal REP comprises a DWDM signal comprising the same number of multiplexed channels (i.e., $\lambda_1$-$\lambda_N$) where each of the multiplexed channels has optical power characteristics similar to those of the channels they are replacing. In this manner, channel equalization and amplification characteristics used by the optical amplifier 140 are acceptable for processing optical signals derived from either the input signal N or replacement signal REP. In this manner, transitioning from the input signal N to replacement signals REP will not induce a large transient adjustment problem for the optical amplifier 140, and in particular will not cause a significant power excursion of any channels added via the switch fabric 120.

The demultiplexer 110 demultiplexes the selected DWDM input signal IN (or REP) to extract therefrom a plurality of optical signals having respective wavelengths denoted as $\lambda_1$, $\lambda_2$, and so on up to $\lambda_N$, which optical signals (channels) are coupled to respective inputs of the switch fabric 120. The switching fabric 120 also receives up to N "add" wavelengths or channels, denoted as ADD at respective inputs. The switch fabric 120, illustratively an M×M switch fabric, provides at its output ports up to N respective signals or channels selected from the selected input channels IN/REP (pass through mode) and/or additional channels ADD. Additionally, the switch fabric 120 couples to a second group of output ports up to N channels to be dropped.

The optical signals selected for propagation as part of the multiplexed output signal OUT are coupled from the switch fabric 120 to the multiplexer 130, where they are multiplexed to form an optical signal corresponding in form to the input signal IN (i.e., a DWDM optical signal comprising up to N wavelengths). The multiplexed signal produced by the multiplexer 130 is then amplified by optical amplifier 140 to produce the output signal OUT.

The optical amplifier may comprise an erbium doped fiber amplifier, semi-conductor optical amplifier, Raman amplifier and the like. Such optical amplifiers typically include various modes of operation adapted to insure appropriate amplification for each of the wavelengths within a DWDM optical signal. The optical amplifier 140 of FIG. 1 may perform various equalization calculations, spectral analysis calculations, spectral analysis calculations, individual and aggregate power calculations and the like among the various wavelengths (channels) within the multiplexed DWDM optical signal. It is noted that such operations are typically not performed rapidly enough to avoid transient errors caused by, for example, an upstream cut fiber condition. However, the controller 150 operates to cause the input selector 105 to provide the replacement signal REP in place of the input signal IN should such a cut fiber condition (or OADM input open condition) be detected. Thus, the relatively slow adaptations made by the optical amplifier 140 to insure appropriate amplification are sufficient to keep the output signal OUT valid for at least those wavelengths including valid data.

The controller 150 controls various operations within the OADM 100 of FIG. 1. For example, in one embodiment the switch fabric 120 includes an input monitor 125 that monitors various parameters associated with the input signals ($\lambda_1$-$\lambda_N$) to the switch fabric 120. The input monitor 125 is capable of determining that the power level and/or data within the received wavelengths indicates that an upstream cut fiber condition or OADM open input condition exists. In response to the determination of such condition, the controller 150 causes the input selector switch 105 to route the replacement optical signal to the demultiplexer 110 instead of the input signal IN. Contemporaneously, the controller 150 causes the optical amplifier 140 to begin the equalization and power distribution calibration processes used to equalize optical energy between channels within the DWDM signal it is processing. An embodiment of the controller 150 will be discussed in more detail below with respect to FIG. 2.

In one embodiment of the invention, the input monitor 125 monitors a plurality of the individual wavelengths $\lambda_1$-$\lambda_N$ and determines thereby whether a condition associated with one of a fiber cut or disconnected input is present. In one embodiment of the invention, in response to this condition the controller 150 causes all of the wavelengths within the input signal IN to be replaced by selecting, using the input selector 105, a corresponding DWDM signal including replacement wavelength channels. In an alternate embodiment of the invention, the replacement signals REP are inserted via the add input signals. In this embodiment of the invention, individual wavelengths $\lambda_1$-$\lambda_N$ within the input signal IN may be selectively replaced by adding corresponding replacement signals and dropping those signals determined by the input monitor 125 to be defective or otherwise inappropriate.

In one embodiment of the invention, a portion (e.g., 1% power) of the input signal IN is sampled by a power detector (PD) 102 comprising an optical splitter and a photo detector to produce thereby a power detection signal PD. The power detection signal PD is coupled to the controller 150, which responsively determines if the power detection signal is above a threshold level indicative of a non-severed upstream fiber condition (or a non-open OADM input condition). If the power level is below the threshold level, then an error condition is assumed and the switch 105 adapted accordingly. It is noted that the power detector 102 may be used in any of the other embodiments of the invention discussed herein with respect to FIGS. 1-6.

In one embodiment of the invention, the optical amplifier A is not used to amplify the DWDM signal provided by the multiplexer 130. Rather, each of the individual wavelengths $\lambda_1$-$\lambda_N$ provided by the switch fabric 120 are individually amplified by respective amplifiers (not shown). In this embodiment, the controller 150 communicates with each of the individual wavelength amplifiers to effect thereby an initiation of a recalibration process. It is also noted that where individual switch fabric outputs are amplified, the controller 150 may selectively cause only those optical amplifiers operative to process replacement signals to enter a calibration process.

In one embodiment of the invention, the power detector 102, input monitor 125 and related logic within the controller 150 may be implemented as a stand-alone detector/control function in which detection of a power level below an appropriate threshold level causes a change in state of a control signal (e.g., SW), thereby cause a replacement of an input WDM or output WDM signal with a replacement signal. In any event, the signal provided at the output will comprise a replacement signal in the case of an inappropriate input signal power level. In embodiments discussed below (e.g., FIGS. 2-6) the replacement signal may comprise a "looped back" signal provided by a physically proximate OADM servicing a second traffic path (e.g., in and East/West traffic path topology).

Figure 2:
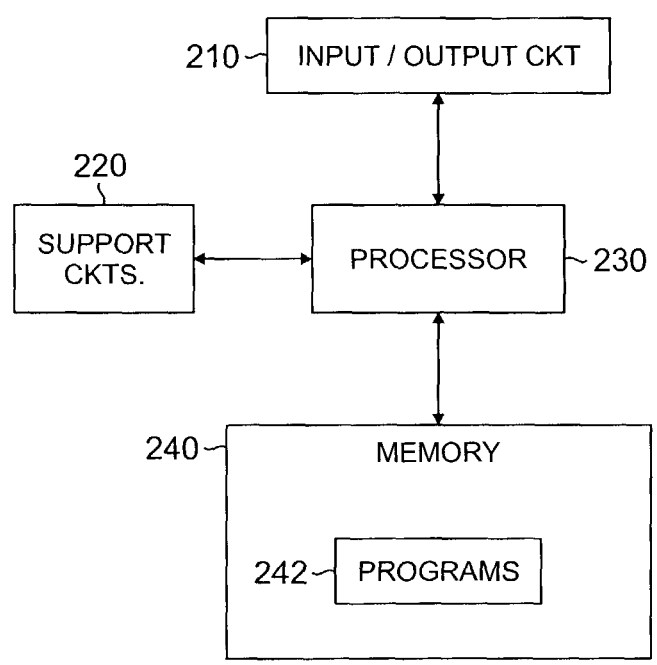
FIG. 2 depicts a high level block diagram of a controller suitable for use in the OADM of FIG. 1.

FIG. 2 depicts a high level block diagram of a controller suitable for use in the OADM of FIG. 1. Specifically, the controller 200 of FIG. 2 is suitable for implementing the controller 150 within the OADM 100 of FIG. 1.

The controller 200 of FIG. 2 comprises a processor 230 as well as memory 240 for storing various control programs and other programs 242. The processor 230 cooperates with conventional support circuitry 220 such as power supplies, clock circuits, cache memory and the like as well as circuits that assist in executing the software routines stored in the memory 340. As such, it is contemplated that some of the steps discussed herein as software processes may be implemented within hardware, for example as circuitry that cooperates with the processor 230 to perform various steps. The controller 200 also contains input/output (I/O) circuitry 210 that forms an interface between the various functional elements communicating with the controller 200.

Although the controller 200 of FIG. 2 is depicted as a general purpose computer that is programmed to perform various control functions in accordance with the present invention, the invention can be implemented in hardware as, for example, an application specific integrated circuit (ASIC) or a field programmable gate array (FPGA). As such, the process steps described herein are intended to be broadly interpreted as being equivalently performed by hardware, software, or a combination thereof.

The memory 240 is used to store various software instructions including those useful in implementing different embodiments of the present invention, such as the steps discussed below with respect to FIG. 3. For example, in one embodiment of the invention the switch fabric 120 includes an input monitor 125 that monitors some or all of the signals ($\lambda_1$ through $\lambda_N$) received by the switch fabric 120. In response to a loss of signal indicative of, for example, a severed upstream fiber optic cable or a disconnected OADM input, the input monitor 125 provides indicia of the options of one or more input signals $\lambda_1$ through $\lambda_N$ to the controller 150. The controller 150 responsively causes one or more replacement signals REPLACE to be inserted in lieu of the missing input signals such that the optical amplifiers 130 will continue to correctly process the output signal OUT.

Figure 3:
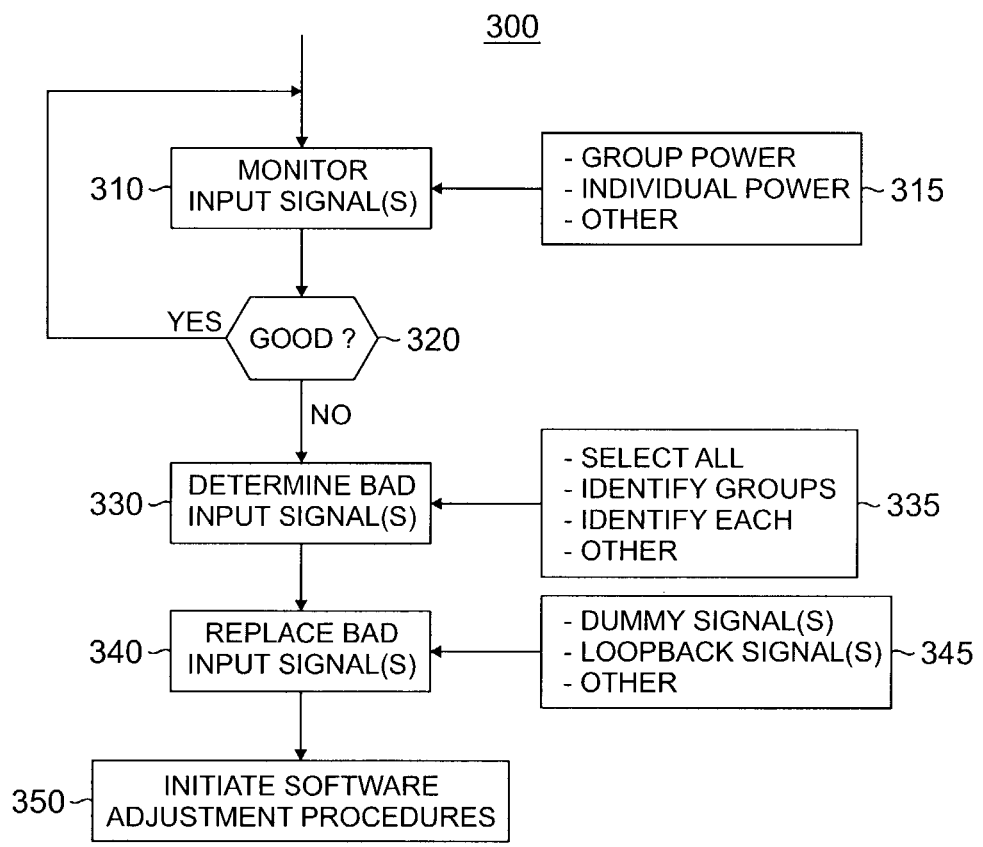
FIG. 3 depicts a flow diagram of a method according to an embodiment of the present invention.

FIG. 3 depicts a flow diagram of a method according to an embodiment of the present invention. Specifically, FIG. 3 depicts a flow diagram of a method 300 suitable for use in the OADM 100 of FIG. 1 for identifying a loss of input signal condition and responsively providing a replacement signal such that optical amplification of one or more added signals is performed in an appropriate manner.

The method 300 of FIG. 3 is entered at step 310, where the input signals (i.e., $\lambda_1$ through $\lambda_N$) are monitored. Referring to box 315, the group power of the input signals (i.e., the aggregate powers of signals $\lambda_1$ through $\lambda_N$) may be monitored, individual input signals may be monitored or other monitoring techniques may be employed. At step 320, a query is made as to whether the monitored input signals are in a "good" status (i.e., no apparent fiber cut or OADM input disconnect condition). If the monitored input signals appear satisfactory, the method continues to monitor and query at steps 310 and 320. In the event of a non-satisfactory condition, the method 300 proceeds to step 330.

At step 330, a determination is made as to whether all or some of the input signals are unsatisfactory. Referring to box 335, this determination may be made with respect to the entirety of the input signals, individual groups of input signals, or each input signal individually, as well as other techniques.

At step 340, at least the unsatisfactory input signal or signals are replaced by alternative or replacement optical signals having at last a similar optical power and spectral characteristics. In the embodiment 100 of FIG. 1, the input monitor 125 and controller 150 operate to replace all of the wavelengths within the input signal IN with corresponding wavelengths within a DWDM replacement signal REP using the input selector switch 105. Referring to box 345, the replacement signals may comprise one or more dummy signals, loop back signals from another OADM (or portions of the OADM 100 of FIG. 1 that are not shown) or other signal sources. In any case, the replacement optical signals comprise optical signals having characteristics similar to the missing optical signals such that the optical amplifiers used within the OADM are not subjected to a fast transient change condition. In this manner, those optical signals added by the OADM 100 of FIG. 1 are appropriately amplified and tend to avoid any increase in bit error rate (BER) or other quality of service (QoS) degradation due to the sudden loss of received input signal IN.

At step 350, software adjustment procedures for the optical amplification stage are initiated. That is, in one embodiment the controller 128 of the switch fabric 120 indicates to the optical amplifier stage that certain input signals are not present and that the optical amplifier should perform various readjustment procedures such as channel equalization and the like as performed within standard optical amplifier adjustment processes.

The method 300 of FIG. 3 is primarily described within the context of a particular OADM topology (i.e., that described above with respect to FIG. 1). However, modifications to the method 300 may be made by those skilled in the art and informed by the teachings of the present invention to enable similar methodology within the context of the OADMs of FIGS. 4-6.

The present invention is especially well suited to optical backbone networks (as opposed to access networks), which are typically symmetrical and bi-directional networks providing an "East" connection to complement a "West" connection having a substantially equal bandwidth. Backbone networks are typically implemented as two fiber links between nodes using one fiber-optic cable (i.e., a cable including at least two fibers). The architecture and configuration of an OADM node in this environment may be symmetric or asymmetric with respect to add-channels, drop-channels and through-channels, though a symmetric configuration is more common. Therefore, through-traffic in the "west" direction will have the same channel count and spectral distribution as through-traffic in the "east" direction. The inventors have determined that the through channels in either direction tend to be equalized to a desired power level at the OADM, and that such redirected or replacement channels provide an excellent substitute (with respect to optical amplifier performance considerations) for lost channels, such that there is no immediate need to reconfigure any optical amplifiers within the network.

Figure 4:
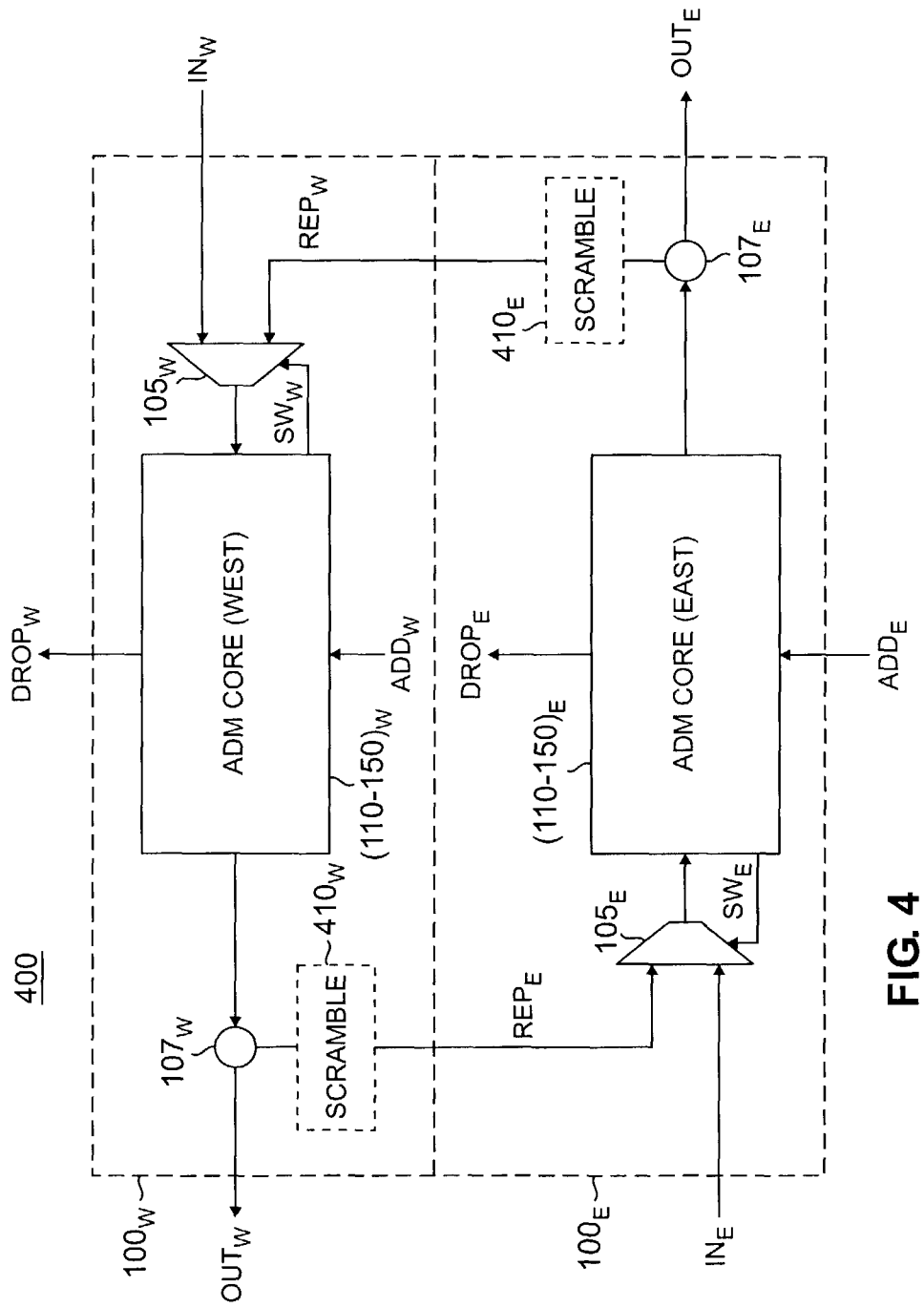
FIGS. 4-5 depict a high level block diagram of alternate embodiments of a pair of OADMs within a bi-directional traffic environment.

FIG. 4 depicts a high level block diagram of a pair of OADMs within a bi-directional traffic environment. In the embodiment of FIG. 4, to suppress optical amplifier transients and stabilize the optical layer downstream of a cable cut, the upstream traffic is looped back and inserted into the downstream direction via a fast optical selector switch. That is, the replacement channels REP discussed above with respect to FIG. 1 are derived from the opposite direction traffic channels.

Specifically, referring to FIG. 4, a pair of OADMs $100_W$ and $100_E$ are shown. Each of the East $100_E$ and West $100_W$ OADMs includes a respective input switch 105, a respective add-drop multiplexer core (110-150) and a respective splitter 107. Each of the OADMs receives a respective input DWDM signal IN at a first input of its respective selector switch 105, and a split portion of the opposed OADM output at a second input of its respective selector switch 105. The output of each selector switch is coupled to the input of its respective OADM core.

Each ADM core comprises the functionality of the demultiplexer 110, switch fabric 120, multiplexer 130, optical amplifier 140 and controller 150 described above with respect to FIG. 1. The output signal produced by each ADM core is coupled to its respective splitter 107, which splits the output signal into two reduced power (e.g., −3 dB) signals. The first split signal is provided as a respective output signal OUT for the next node in the network, while the second split signal REP is provided as the second input signal (i.e., the replacement signal) to the switch 105 of the opposite direction OADM.

In operation, referring to the East signal path, an input signal $IN_E$ comprises a DWDM signal including up to N individual wavelengths. One of the East input signal $IN_E$ and a portion of the West output signal $OUT_W$ is selectively coupled to the East ADM core via the East OADM input switch $105_E$ in response to a switch control signal $SW_E$ provided by the controller 150 within the East ADM core. The East ADM core responsively adds up to N signals $ADD_E$ and drops up to N signals $DROP_E$ as previously discussed and produces a DWDM output signal which is coupled to the East splitter $107_E$.

Similarly, referring to the West signal path, an input signal $IN_W$ comprises a DWDM signal including up to N individual wavelengths. One of the West input signal $IN_W$ and the portion of the East output signal $OUT_E$ is selectively coupled to the West ADM core via the West OADM input switch $105_W$ in response to a switch control signal $SW_W$ provided by the controller 150 within the West ADM core. The West ADM core responsively adds up to N signals $ADD_W$ and drops up to N signals $DROP_W$ as previously discussed and produces a DWDM output signal which is coupled to the West splitter $107_W$.

In one embodiment of the invention, the portion of the output signals diverted to the input of the opposing ADM cores is scrambled by either an East $410_E$ or West $410_W$ scrambler. In this manner, the physical layer error of a fiber cut or open input is correctly interpreted as an error by a higher logical layer of, for example, a SONET system. That is, the rerouted data will likely not cause a loss of signal (LOS) error within the system, even thought the data is invalid. To induce an error (since the rerouted or replacement data is not valid to the link(s) into which it is routed), the scrambling of such data will likely cause at least loss of frame (LOF) error.

Figure 5:
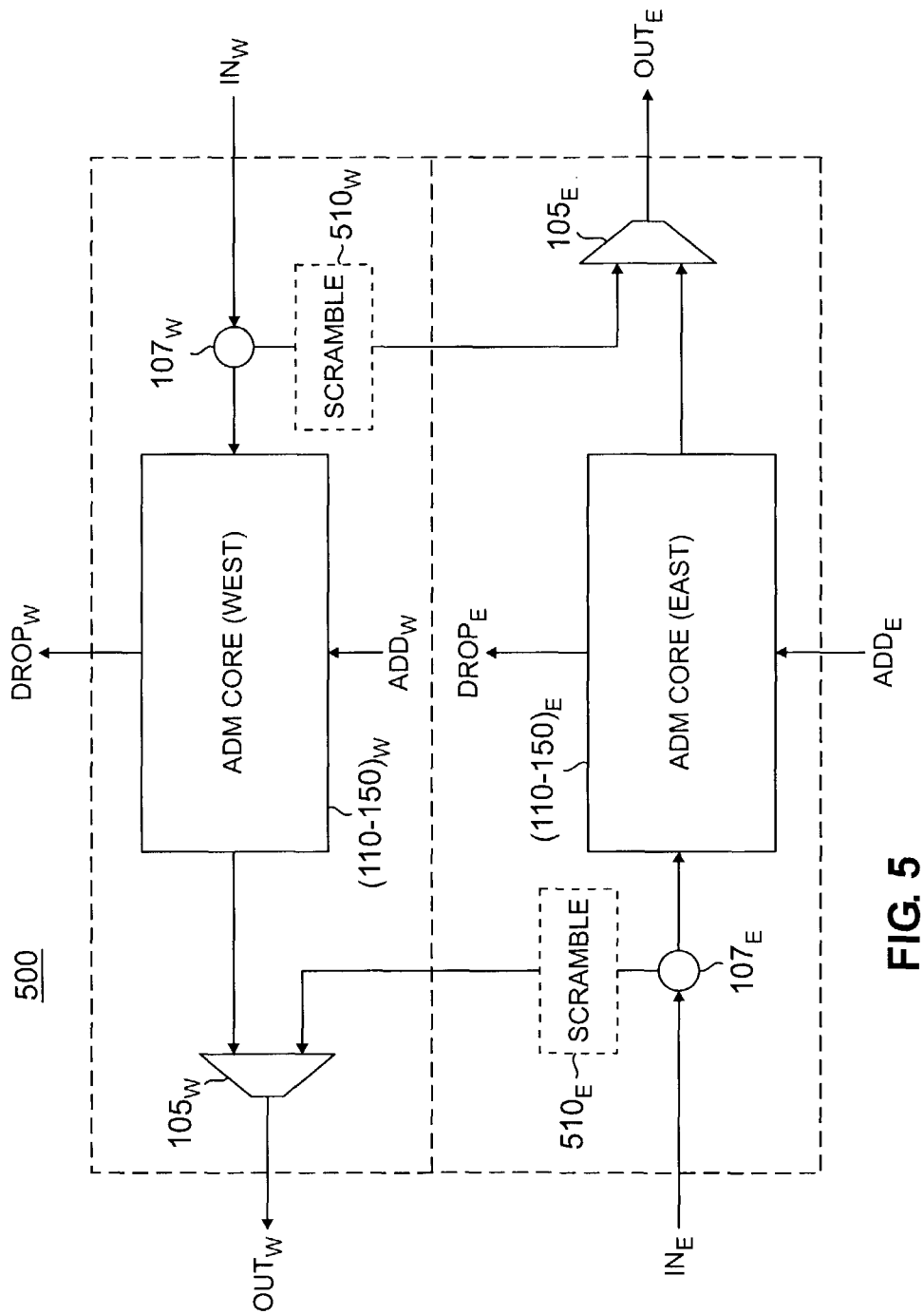

FIG. 5 depicts a high-level block diagram of a pair of OADMs within a bi-directional traffic environment. Specifically, the OADM pair 500 of FIG. 5 comprises a modified version of the OADM pair 400 of FIG. 4. That is, each of an East $100_E$ and West $100_W$ OADMs of FIG. 5 includes a respective output switch 105 (rather than an input switch), a respective add-drop multiplexer core (110-150), a respective input splitter 107 (rather than an output splitter) and an optional scrambler 510. In FIG. 5, the position of the switches 105 and splitters 107 is reversed from that of FIG. 4 such that the looped back replacement signal(s) comprises and input signal IN rather than an output signal OUT.

In operation, referring to the East signal path, an input signal $IN_E$ comprises a DWDM signal including up to N individual wavelengths. The East splitter $107_E$ provides one portion (e.g., half the power) of the input signal $IN_E$ to the East ADM core and the other portion to an input of the West OADM output switch $105_W$. The East ADM core responsively adds up to N signals $ADD_E$ and drops up to N signals $DROP_E$ as previously discussed and produces a DWDM output signal which is coupled to the East output switch $105_E$. In response to a switch control signal $SW_E$ provided by the controller 150 within the East ADM core, the East output switch $105_E$ couples one or the output of the East ADM core and a portion of the West input signal $IN_W$ to its output as the east output signal $OUT_E$. The West signal path works in a similar manner.

In an alternate embodiment of the OADM pairs of FIGS. 4 and 5, the 1×2 switches and splitter used for each of the East and West paths may be replaced with a 2×2 switch. Specifically, rather than splitting the input (or output) optical signals, a 2×2 switch is used to nominally route each respective input signal IN through its respective ADM core and to its respective output signal path out. In case of a fiber cut condition, the 2×2 switch operates to route active data signals as output signals OUT.

Within the context of a synchronous optical network (SONET) system, such as a ring network, a loss of signal (LOS) on the line side of an OADM does not automatically result in a LOS for SONET client equipment (i.e., the client side laser and modulator are not switched off immediately). Where an automatic protection switch (APS) is used, it is especially important to give error signaling to the network manager and such that the network traffic may be routed via an alternate path.

Figure 6A:
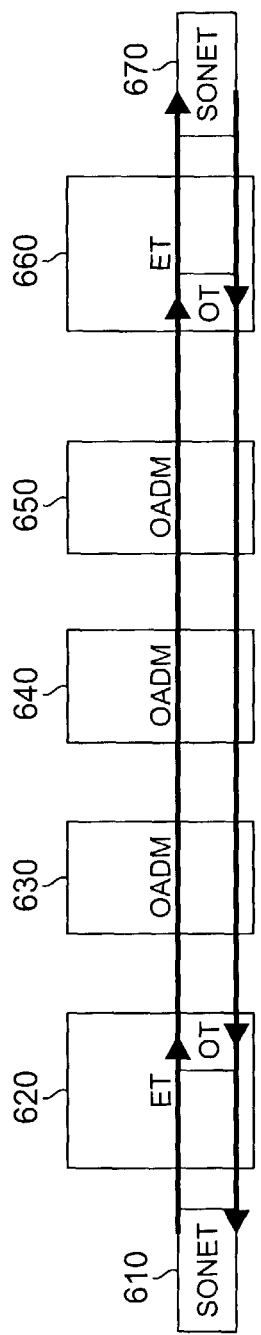
FIG. 6 depicts a synchronous optical network (SONET) useful in understanding an embodiment to the present invention.
Figure 6B:
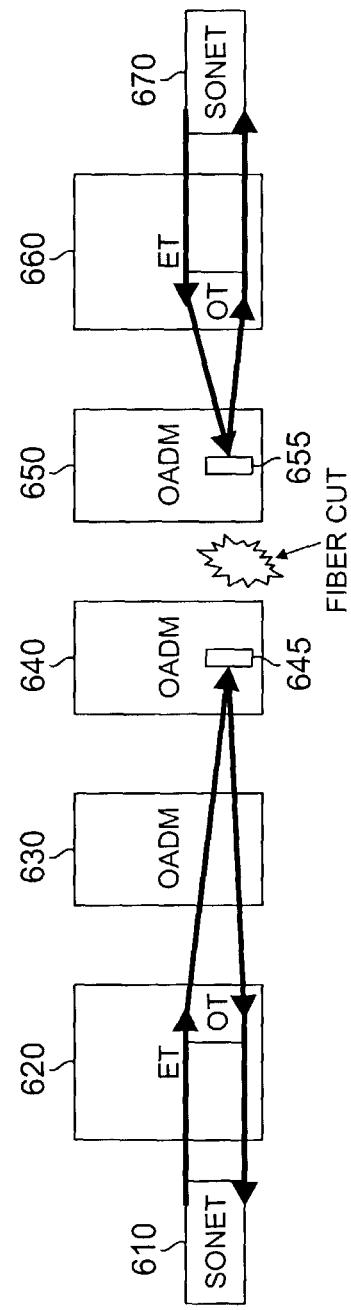

FIG. 6 depicts a synchronous optical network (SONET) useful in understanding an embodiment to the present invention. Specifically, FIG. 6A depicts a SONET at work comprising a first SONET network element 610 communicating with a second SONET network element 670 via East and West communications paths including, in the order named, a first optical translator (OT) that creates a suitable DWDM wavelenth signal, a plurality of optical ADMs 630-650 and a second OT. FIG. 6B depicts a fiber cut occurring between OADMs 640 and 650. In this instance, it is noted that the East bound signal provided by SONET element 610 is guided back towards SONET element 610 via a loop back element 645 within OADM 640. Similarly, a West bound signal provided by SONET element 670 is routed back to SONET element 670 via a loop back element 655 within OADM 650.

The system 600 of FIG. 6 uses a two step process to handle the fiber cut. As a first step, the optical amplifier transient avoidance scheme discussed above with respect to FIGS. 1-5 is employed, thereby ensuring appropriate optical amplification within the various OADMs and OTs as the various optical amplifiers avoid transient-induced error and refine their operation under software control. In this manner, signals added and dropped between OADMs having paths that avoid the fiber cut are still valid and usable. Optionally, by scrambling loop back channels, loss of frame (LOF) errors may be generated to inform the SONET management system that a major signal degradation has occurred, and thereby to induce automatic protection switching at the SONET layer.

The scramblers discussed above with respect to the various figures may be implemented by using a Lyot depolarizer which comprises, in part, a high second order PMD element. This may be implemented using approximately 80 meters of PM fiber in two sections spliced under 45 degree angles. An alternate embodiment comprises an all pass filter loop, in which a 3DBM coupler has one output spliced back into its inputs.

Although various embodiments that incorporate the teachings of the present invention have been shown and described in detail herein, those skilled in the art can readily devise many other varied embodiments that still incorporate these teachings.

What is claimed is:

1. A method of transient control in a wavelength division multiplexed (WDM) optical transmission system, comprising:
    monitoring a WDM optical signal received via an optical signal bearing medium and having a plurality of wavelength channels including at least one uninterrupted wavelength channel and at least one interrupted wavelength channel; and
    replacing the at least one interrupted wavelength channel with a replacement wavelength channel having optical power and spectral characteristics similar to the at least one interrupted wavelength channel such that optical transients normally associated with amplification of a WDM optical signal having an interrupted wavelength channel are reduced, the WDM optical signal including the at least one uninterrupted wavelength channel and at least one replacement wavelength channel.

2. The method of claim 1, wherein the monitoring is performed by monitoring the individual power level of each of the plurality of wavelength channels.

3. The method of claim 1, wherein the monitoring is performed by monitoring the group power level of the plurality of wavelength channels.

4. The method of claim 1, further comprising:
receiving the WDM optical signal at an optical add drop multiplexer (OADM).

5. The method of claim 4, wherein the OADM is a first OADM, wherein the replacement wavelength channel is received from a second OADM.

6. The method of claim 5, wherein the replacement wavelength channel comprises at least one of:
a channel output from a core of the second OADM; and
a channel input to a core of the second OADM.

7. The method of claim 4, further comprising:
providing the WDM optical signal, including the at least one uninterrupted wavelength channel and the at least one replacement wavelength channel, to a core of the OADM.

8. The method of claim 4, further comprising:
receiving the WDM optical signal, including the at least one uninterrupted wavelength channel and the at least one replacement wavelength channel, from a core of the OADM.

9. The method of claim 1, further comprising:
scrambling the replacement wavelength channel.

10. The method of claim 9, wherein scrambling the replacement wavelength channel causes at least one of a loss of signal (LOS) and loss of frame (LOF) error within optical networking equipment receiving the replacement wavelength channel.

11. An apparatus for transient control in a wavelength division multiplexed (WDM) optical transmission system, comprising:
means for monitoring a WDM optical signal having a plurality of wavelength channels including at least one uninterrupted wavelength channel and at least one interrupted wavelength channel; and
means for replacing the at least one interrupted wavelength channel with a replacement wavelength channel having optical power and spectral characteristics similar to the at least one interrupted wavelength channel such that optical transients normally associated with amplification of a WDM optical signal having an interrupted wavelength channel are reduced, the WDM optical signal including the at least one uninterrupted wavelength channel and at least one replacement wavelength channel.

12. The apparatus of claim 11, wherein the monitoring means is configured for monitoring the individual power level of each of the plurality of wavelength channels.

13. The apparatus of claim 11, wherein the monitoring means is configured for monitoring the group power level of the plurality of wavelength channels.

14. The apparatus of claim 11, wherein the WDM optical signal is received at an optical add drop multiplexer (OADM).

15. The apparatus of claim 14, wherein the OADM is a first OADM, wherein the replacement wavelength channel is received from a second OADM.

16. The apparatus of claim 15, wherein the replacement wavelength channel comprises at least one of:
a channel output from a core of the second OADM; and
a channel input to a core of the second OADM.

17. The apparatus of claim 14, further comprising:
means for providing the WDM optical signal, including the at least one uninterrupted wavelength channel and the at least one replacement wavelength channel, to a core of the OADM.

18. The apparatus of claim 14, further comprising:
means for receiving the WDM optical signal, including the at least one uninterrupted wavelength channel and the at least one replacement wavelength channel, from a core of the OADM.

19. The apparatus of claim 11, further comprising:
means for scrambling the replacement wavelength channel.

20. The apparatus of claim 19, wherein scrambling the replacement wavelength channel causes at least one of a loss of signal (LOS) and loss of frame (LOF) error within optical networking equipment receiving the replacement wavelength channel.

21. A computer readable storage medium storing instructions which, when executed by a processor, cause the processor to perform a method for transient control in a wavelength division multiplexed (WDM) optical transmission system, the method comprising:
monitoring a WDM optical signal having a plurality of wavelength channels including at least one uninterrupted wavelength channel and at least one interrupted wavelength channel; and
replacing the at least one interrupted wavelength channel with a replacement wavelength channel having optical power and spectral characteristics similar to the at least one interrupted wavelength channel such that optical transients normally associated with amplification of a WDM optical signal having an interrupted wavelength channel are reduced, the WDM optical signal including the at least one uninterrupted wavelength channel and at least one replacement wavelength channel.

22. The computer readable storage medium of claim 21, wherein the monitoring is performed by monitoring the individual power level of each of the plurality of wavelength channels.

23. The computer readable storage medium of claim 21, wherein the monitoring is performed by monitoring the group power level of the plurality of wavelength channels.

24. The computer readable storage medium of claim 21, further comprising:
receiving the WDM optical signal at an optical add drop multiplexer (OADM).

25. The computer readable storage medium of claim 24, wherein the OADM is a first OADM, wherein the replacement wavelength channel is received from a second OADM.

26. The computer readable storage medium of claim 25, wherein the replacement wavelength channel comprises at least one of:
a channel output from a core of the second OADM; and
a channel input to a core of the second OADM.

27. The computer readable storage medium of claim 24, further comprising:
providing the WDM optical signal, including the at least one uninterrupted wavelength channel and the at least one replacement wavelength channel, to a core of the OADM.

28. The computer readable storage medium of claim 24, further comprising:
receiving the WDM optical signal, including the at least one uninterrupted wavelength channel and the at least one replacement wavelength channel, from a core of the OADM.

29. The computer readable storage medium of claim 21, further comprising:
scrambling the replacement wavelength channel.

30. The computer readable storage medium of claim 29, wherein scrambling the replacement wavelength channel causes at least one of a loss of signal (LOS) and loss of frame (LOF) error within optical networking equipment receiving the replacement wavelength channel.

31. An apparatus for transient control in a wavelength division multiplexed (WDM) optical transmission system, comprising:
   a monitor configured to monitor a WDM optical signal having a plurality of wavelength channels including at least one uninterrupted wavelength channel and at least one interrupted wavelength channel; and
   a controller configured to replace the at least one interrupted wavelength channel with a replacement wavelength channel having optical power and spectral characteristics similar to the at least one interrupted wavelength channel such that optical transients normally associated with amplification of a WDM optical signal having an interrupted wavelength channel are reduced, the WDM optical signal including the at least one uninterrupted wavelength channel and at least one replacement wavelength channel.

32. The apparatus of claim 31, wherein the monitor is configured to monitor the individual power level of each of the plurality of wavelength channels.

33. The apparatus of claim 31, wherein the monitor is configured to monitor the group power level of the plurality of wavelength channels.

34. The apparatus of claim 31, wherein the WDM optical signal is received at an optical add drop multiplexer (OADM).

35. The apparatus of claim 34, wherein the OADM is a first OADM, wherein the replacement wavelength channel is received from a second OADM.

36. The apparatus of claim 35, wherein the replacement wavelength channel comprises at least one of:
   a channel output from a core of the second OADM; and
   a channel input to a core of the second OADM.

37. The apparatus of claim 34, further comprising:
   an input selector configured to provide the WDM optical signal, including the at least one uninterrupted wavelength channel and the at least one replacement wavelength channel, to a core of the OADM.

38. The apparatus of claim 34, further comprising:
   a splitter configured to receive the WDM optical signal, including the at least one uninterrupted wavelength channel and the at least one replacement wavelength channel, from a core of the OADM.

39. The apparatus of claim 31, further comprising:
   a scrambler configured to scramble the replacement wavelength channel.

40. The apparatus of claim 39, wherein the scrambler is configured to scramble the replacement wavelength channel to cause at least one of a loss of signal (LOS) and loss of frame (LOF) error within optical networking equipment receiving the replacement wavelength channel.

* * * * *